United States Patent [19]

Ledet et al.

[11] Patent Number: 5,120,265
[45] Date of Patent: Jun. 9, 1992

[54] APPARATUS FOR AND METHODS FOR IMPROVING THE YIELD OF PEELED SHRIMP MEAT OBTAINED WITH ROLLER TYPE SHRIMP PEELING MACHINERY

[75] Inventors: Brent A. Ledet, Kenner; George C. Lapeyre, New Orleans, both of La.

[73] Assignee: The Laitram Corporation, New Orleans, La.

[21] Appl. No.: 707,829

[22] Filed: May 30, 1991

[51] Int. Cl.$^5$ .............................................. A22C 21/02
[52] U.S. Cl. ............................................ 452/5; 452/2
[58] Field of Search ....................... 452/50, 2, 129, 130

[56] References Cited

U.S. PATENT DOCUMENTS 2,853,733  9/1958  Greiner .................................... 452/5

Primary Examiner—Bruce M. Kisliuk
Assistant Examiner—Lawrence Cruz
Attorney, Agent, or Firm—Laurence R. Brown; James T. Cronvich

[57] ABSTRACT

This invention increases the yield of output shrimp meat produced by roller type peeler apparatus, and achieves this without any substantial decreases in throughput quantity. The yield increase is achieved by means of critical interacting operating relationships in the peeling action between power rollers, intermediate rollers and insert rollers, expressed in terms of relative roller diameters. Preferred sets of rollers are identified that significantly increase the yields of cold water Pandalus species of shrimp in sizes of 90/kg to 350/kg over conventional commercial rollers. Surprisingly, the high throughput quantity of the peelers is not seriously compromised and may be even increased by the ability to provide more peeling channels in a conventional size peeling tray by replacement with smaller diameter power rollers. The preferred roller sets for use in current standard commercial equipment, without other changes, has lower power rollers of 2.5 inch (6.4 cm) diameter, intermediate upper channel forming rollers of 2 inch (5 cm) diameter and insert rollers of 7/16 inch (1.1 cm) diameter. The methods of establishing critical roller diameters provided by this invention will permit adaption of the feature of obtaining highest yields feasible with critical roller diameter selections for various conditions encountered in the shrimp peeling industry ar at a particular peeling site, including product variations from different shrimp catches, sizes, species, etc.

11 Claims, 4 Drawing Sheets

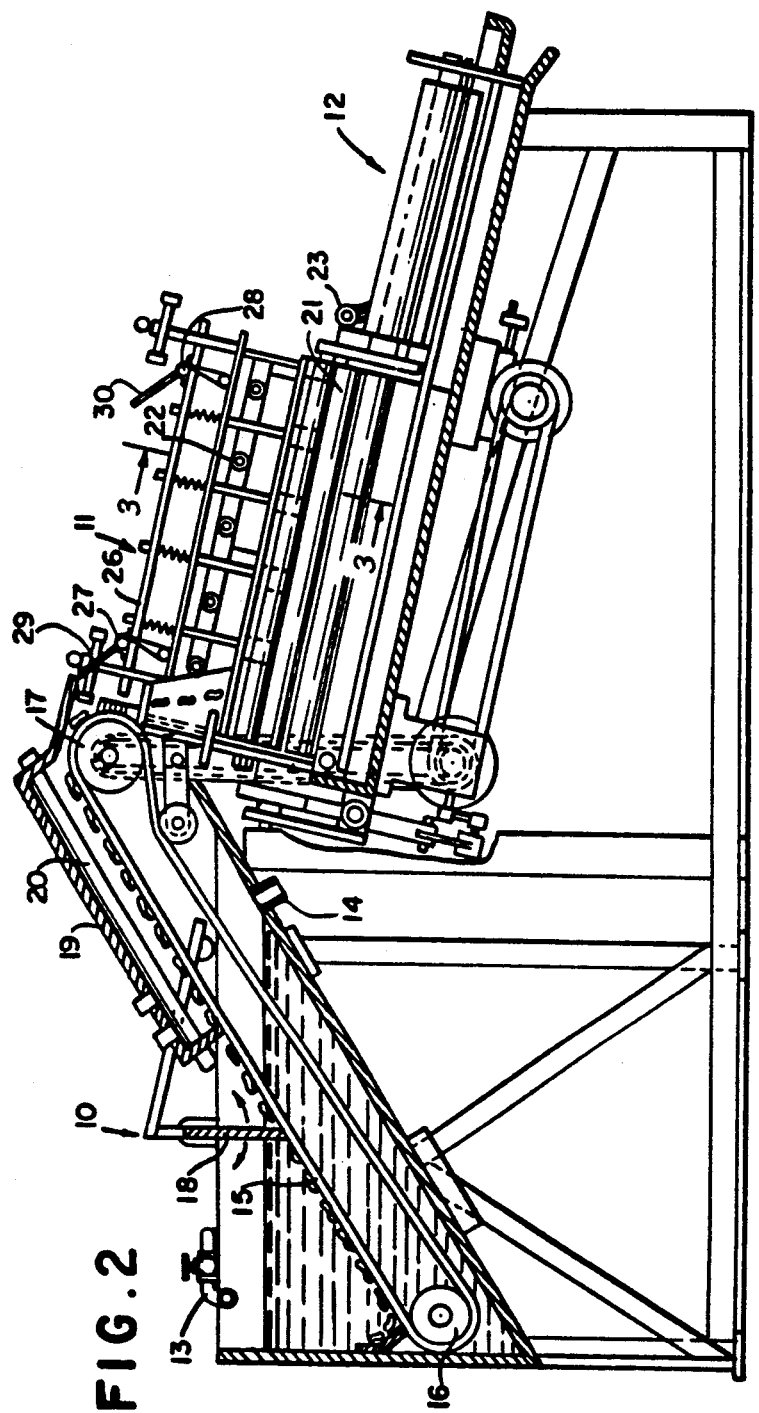
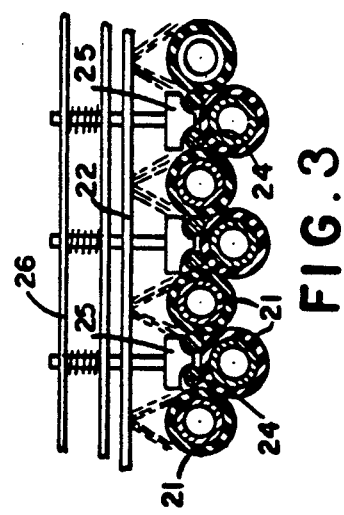

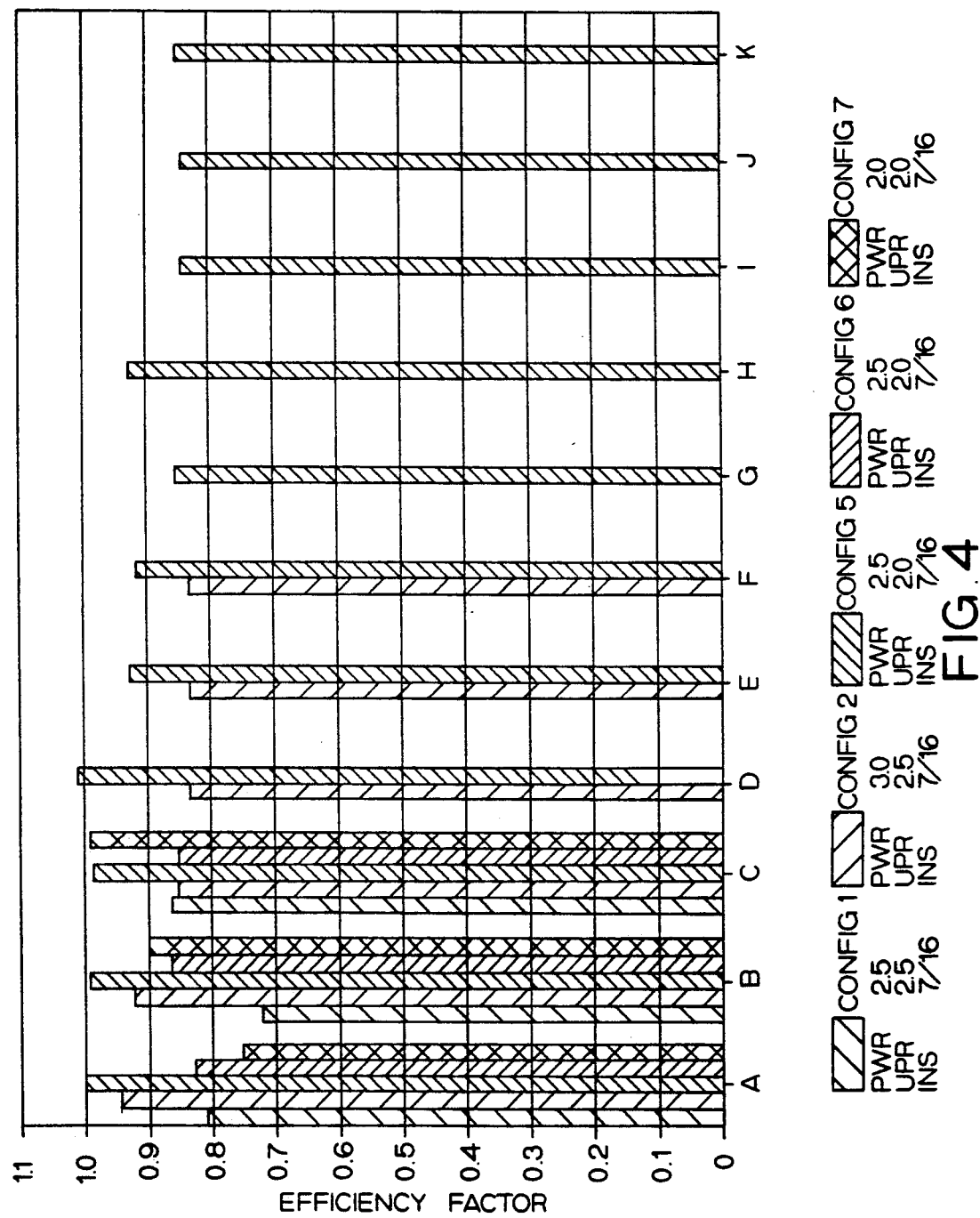

APPARATUS FOR AND METHODS FOR IMPROVING THE YIELD OF PEELED SHRIMP MEAT OBTAINED WITH ROLLER TYPE SHRIMP PEELING MACHINERY

TECHNICAL FIELD

This invention relates to shrimp peeling, and more particularly it relates to apparatus for and methods of improving the yield of peeled shrimp meat obtained from input shrimp being peeled with roller type peeling machinery.

BACKGROUND ART

Shrimp peeling machinery has been introduced into the art and is now commercially and conventionally used in the peeling of shrimp because of the high alternative labor cost of peeling shrimp by hand, particularly in the case of smaller sized cold water shrimp and shrimp of the Pandalus species. The following patents are representative of the nature and state of the art of roller type shrimp peeling machinery.

U.S. Pat. No. Re. 26,971, Oct. 20, 1970, James M. Lapeyre, is directed to roller type shrimp peeling apparatus which is commercially available in the shrimp peeling industry. This apparatus has peeling roller sets with lower power rollers interacting with intermediate upper channel forming rollers and smaller diameter insert rollers interacting between nips formed between the power rollers and intermediate rollers.

Insert roller improvements are set forth, for example, in U.S. Pat. No. 3,704,484, Dec. 5, 1972, James M. Lapeyre, et al., which provide for better peeling action of the shrimp by means of rough sharp knife-like surfaces on the insert rollers. These roughened rollers however may decrease the yield of usable output shrimp meat by abrasion of the surface meat. Gentler action can be chosen by the surface texture of the rollers.

In general, such peeling apparatus has been designed for maximizing throughput of shrimp being peeled, and thus the roughened insert roller surfaces peel more shrimp faster. In that respect, it is also known from the prior art that the peeling is dependent upon the interaction such as the entry angle between the respective rollers and characteristics of the peeling nips between the rollers as defined by, for example, the diameters of the insert rollers. Thus, for establishing characteristics of commercial lines of peelers, the rollers have been designed in general to maximize peeling throughput of a significant range of shrimp species and sizes as found characteristic in the shrimp peeling industry. Changes in adjustable operating parameters take into account conditions found at local shrimp peeling sites for choosing best available operating conditions of the shrimp peeling machinery.

Prior art shrimp peeling machines have thus provided significant advantage through lower peeling cost and higher peeling quantities. However, to produce acceptable output product quality, the peelers needed to provide cosmetically acceptable shrimp along with the high throughput volume. Thus, prior art shrimp peeling machinery considered cosmetic features for producing an output product that looked good, as well as on features that improved the throughput quantities available. Some attention has also been given to special problems introduced in peeling smaller sized shrimp, cold water shrimp and particular varieties such as Pandalus shrimp in order to solve problems that appeared in the industry. Thus it was known, for example, that some shrimp could be better peeled if cooked at the peeling site and introduced hot into the peeler apparatus.

However, there remains a significant problem with prior art shrimp peeling machinery in that there has been a prior art tendency to aggressively tear off the shells and scrub meat off a roughened peeled shrimp surface to better the throughput efficiency of production. This means that in commercially available peelers of the prior art, a significant loss of usable output shrimp meat product has been tolerated in peeling machinery. However, at the prices obtained from the peeled shrimp, the loss of usable output shrimp meat results in large losses of potential profits in the shrimp industry.

Accordingly it is a primary object of this invention to increase the output yield of usable shrimp meat obtainable with shrimp peeling machinery of the prior art.

This objective, however, introduces great challenges because of the many factors that affect the yield of output meat. Thus, consider that in the machinery factors such as the roller surfaces, the water flow, the temperature and cooking conditions, the aging and wear of the machinery, the throughput volume, the residence time in the peeler, the water flow conditions, the particular peeler design characteristics and spacing or tolerance adjustments, etc. all affect the output yield of usable shrimp meat.

Factors affecting the output meat yield are still more complex because of varying conditions in the shrimp product also. Thus, many variable conditions of the shrimp affect output yield of shrimp meat, such as size, the particular shrimp growing history which varies with catch or school, the location, the species, the aging when peeled, the peeling temperature, the storage history after catch including freezing and thawing conditions, and cooking conditions, etc. This complexity and the interactivity of such factors have made it impractical in the past to investigate or isolate what, if any, methods or equipment changes could in general significantly improve the output yield of usable shrimp meat over such wide ranges of products, machinery and conditions. Because of the interaction of product costs and peeling costs an improvement in output yield is particularly desired in some manner that did not significantly decrease the throughput volume of peeled shrimp. Furthermore, any attempts to optimize conditions of engineering design or processing methods that might have been made at particular peeler installations where restricted ranges of products and conditions exist, if successful, could not be applied in general to shrimp peeling machinery design or methods of peeling to assure results over a significant range of conditions generally found throughout the shrimp peeling industry, which must be the basis for a commercially acceptable production peeler.

Accordingly it is a more specific object of this invention to provide improved apparatus and methods for increasing the yield of usable output of shrimp meat valid for a wide range of conditions actually encountered in the industry.

Other objects, features and advantages of the invention will be found throughout the following description, drawings and claims.

DISCLOSURE OF THE INVENTION

This invention therefore isolates and modifies critical elements in the apparatus and processing of shrimp which are substantially universally applicable to a wide range of conditions found in the shrimp peeling industry to effect a substantial improvement in the output yield of usable shrimp meat. It is therefore found in accordance with this invention that substantially improved yields result with a change of long accepted standard roller diameters conventional in the art to roller diameters having a critical diameter relationship explicitly resulting in significant increases in the output yield of peeled shrimp.

It has been ascertained that critical ratios of diameters relevant to the improvements in output yield of peeled shrimp exist between three interacting rollers in shrimp peeler equipment, namely the power rollers, intermediate nip forming or upper rollers positioned between power rollers, and insert rollers operable in the nips formed between the intermediate rollers and the power rollers.

This critical relationship and the general environment relating to the rollers in their functioning will be set forth in detail hereinafter with reference to the accompanying drawings, tables and examples illustrating the nature of the invention as related to typical operating conditions in the shrimp peeling industry.

BRIEF DESCRIPTION OF THE DRAWINGS

In the drawings, wherein like reference characters used in the several views relate to similar features to facilitate comparison:

FIG. 2 is a side view, partly in section, of the shrimp peeling apparatus of FIG. 1, FIG. 3 is a fragmental view of the peeling rollers, partly in section taken along lines 3—3 in FIG. 2, FIG. 4 is a bar chart summarizing the yield from various roller sets of differing diameters for smaller sized shrimp.

THE PREFERRED EMBODIMENT

Figure 1:
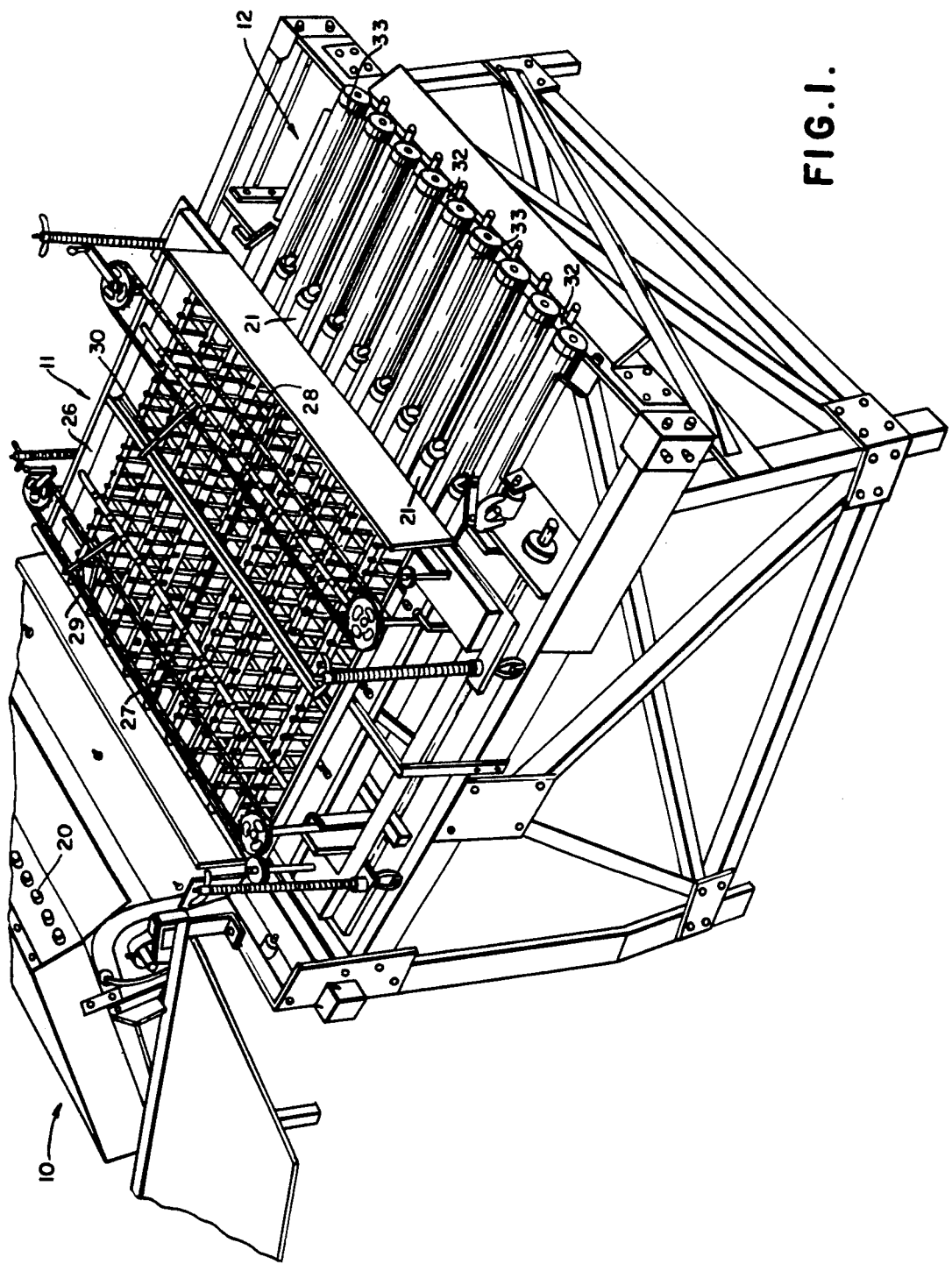
FIG. 1 is a perspective view of shrimp peeling apparatus embodying the invention.

The general nature of the shrimp peeling apparatus of FIGS. 1 and 2 is known in the art, and thus need only be briefly discussed herein. Shrimp to be peeled are put into feed tank 10 for movement on conveyor 15 through cooker 19 over roller 17 onto the peeling rollers in the first peeling section 11, from which they are passed onto rollers in the second peeling section 12 for polishing the surface. Thus, the primary peeling activity to which this invention relates takes place in the first section 11, by means of sets of rollers such as shown in FIG. 3.

The rollers are arranged in sets, wherein lower power rollers 24 are spaced apart for interaction with upper intermediate channel forming rollers 21. Insert, small diameter rollers 25 interact in the nips between the lower power rollers 24 and the upper intermediate rollers 25. A suitable mechanism is provided for retaining the insert rollers in place. The standardized prior art dimensions for the roller diameters in commercial roller peelers of this type are 3 inches (7.5 cm) for the power rollers, 2.5 inches (6.4 cm) for the intermediate rollers and 7/16 inch (1.1 cm) for the insert rollers. These dimensions were adopted for optimal operation of the peelers in obtaining highest throughput capacity with usable output products of acceptable cosmetic characteristics over a wide range of conditions found in the shrimp peeling industry, including different sizes and species of shrimp and different operating conditions for the peeling apparatus.

It has in the past been recognized in the shrimp peeler industry that the diameters of the insert rollers can be optimized for special purposes. Thus, different insert roller sizes can be used in conjunction with the upper and power rollers for better peeling action with different sized shrimp, such as smaller sizes of about 350 count per kilogram and larger sizes of about 90 count per kilogram. The output yield of usable peeled shrimp meat also is affected by roller size, since peeling roughness is a function of the nip angle between rollers as well as the roller surfaces, particularly the insert roller. However there are so many dynamic machine parameters and product characteristics that also affect the cosmetic characteristics of the peeled shrimp, the throughput volume and the yield of usable meat and the ability of the apparatus to successfully function under general purpose use over a wide range of conditions encountered in the industry that compromises have been made in standardizing roller diameters. This has resulted in commercial standards such as the aforesaid roller diameters in roller sets located in a peeling tray accommodating nine power rollers with accompanying eight upper rollers and sixteen insert rollers. This size of roller and peeling tray has been very successful in peeling cold water species of shrimp when hot from a cooker, such as the Pandalus species, in larger sizes of less than 200/kg over a wide range of conditions such as variations in raw shrimp, the machine settings, wear and operating conditions, etc.

To attain the objectives of this invention, namely that the yield of usable shrimp meat be substantially increased without significantly reducing the throughput capacity of the shrimp peeling apparatus was a formidable problem. Thus many complexities and conditions encountered in the shrimp peeling apparatus, industry conditions and raw shrimp products available affect the throughput quantities and cosmetic characteristics of the output product. Logically as a conventional design problem, if roller design was to be considered, the price to be paid by reducing peeling effectiveness to avoid peeling off some of the shrimp meat would be a significant loss in the throughput quantity capacity resulting from gentler peeling, tending to discourage the possible solution by changes in roller characteristics.

Furthermore the complex variables of many factors encountered in machine parameters and product characteristics appeared to make the problem unsolvable because so many dynamic variables that related to the yield of shrimp meat could be counterproductive. It was further a natural presumption that the rollers had been optimized to give the best balance between throughput quantity and cosmetically acceptable or useful shrimp meat.

However, nevertheless it was necessary to accumulate empirical data with operating roller type peeling apparatus under actual conditions encountered in the industry in order to determine whether improvements in the yield of output shrimp meat were possible at an acceptable price of output quantity reduction. In such investigations of peeler yields, it was necessary to reduce the variables affecting yield as much as feasible. This was feasible with the apparatus configuration and operating conditions. However, the system must work over at least a reasonable range of the variations of raw shrimp, in terms of catches or batches, aging and treatment after catch such as freezing, etc. Accordingly, the single dynamic variable of relative roller diameters was chosen as a controlled variable where different batches of shrimp typically obtainable for peeling in the industry were peeled comparatively with seven different roller configurations while observing the yield.

The tests were made with frozen cold water shrimp of the Pandalus species, which were graded into three sizes before freezing to decrease variations in thawing history obtained in mixed size batches. Category 1 designates shrimp smaller than 200/kg; Category 2 designates shrimp between about 100/kg and 200/kg; Category 3 designates shrimp larger than 100/kg. These raw shrimp of graded size were thawed, cooked and peeled hot from the cooker. A standard of 100% yield was determined for each batch by carefully hand peeling the shrimp to obtain the greatest yield of usable shrimp meat. Summary results are compiled in the following Table 1, wherein roller configuration 2 was the conventional commercial standard and the preferred roller configuration 5 showed disproportionate improvements in yield over any other sets of rollers. Several runs were made for each batch of raw shrimp as summarized in the table with spaces between batches.

TABLE 1
SUMMARY OF TESTS COMPARING ROLLER CONFIGURATIONS WITH YIELD

| ROLLER SET CONFIGURATION | YIELD 100% | YIELD ACTUAL | EFFICIENCY | SIZE | kg/HR |
| --- | --- | --- | --- | --- | --- |
| 1 | 36.81 | 29.88 | .81 | 1 | — |
| 1 | 38.75 | 27.92 | .72 | 1 | — |
| 1 | 35.20 | 30.43 | .86 | 1 | — |
| 1 | 35.00 | 28.39 | .81 | 2 | — |
| 1 | 30.20 | 30.05 | 1.0 | 2 | — |
| 1 | 26.05 | 18.20 | .70 | 2 | — |
| 1 | 31.71 | 30.55 | .96 | 2 | — |
| 1 | 29.00 | 28.95 | 1.0 | 3 | — |
| 1 | 30.93 | 28.01 | .91 | 3 | — |
| 1 | 32.80 | 27.22 | .83 | 3 | — |
| 5 | 33.44 | 29.99 | .90 | 2 | 43.5 |
| 5 | 33.40 | 30.67 | .92 | 2 | 45.4 |
| 5 | 33.99 | 29.74 | .87 | 2 | 45.4 |
| 5 | 29.08 | 29.81 | 1.0 | 1 | 50 |
| 5 | 30.82 | 30.46 | .99 | 1 | 50 |
| 5 | 33.07 | 32.32 | .98 | 1 | 50 |
| 5 | 31.70 | 29.21 | .92 | 3 | 40.8 |
| 5 | 34.00 | 28.88 | .85 | 3 | 39.5 |
| 5 | 34.50 | 28.00 | .81 | 3 | 40.8 |
| 5 | 26.31 | 26.62 | 1.01 | 1 | 50.0 |
| 5 | 33.78 | 31.13 | .92 | 1 | 48.5 |
| 5 | 33.18 | 30.32 | .91 | 1 | 49.0 |
| 7 | 33.0 | 29.78 | .90 | 1 | 33.0 |
| 7 | 24.9 | 24.58 | .99 | 1 | 33.5 |
| 2 | 33.43 | 31.41 | .94 | 1 | 57.0 |
| 2 | 34.59 | 31.98 | .92 | 1 | 57.0 |
| 2 | 33.01 | 27.99 | .85 | 1 | 57.0 |
| 6 | 39.50 | 32.30 | .82 | 1 | 50.0 |
| 6 | 39.40 | 34.02 | .86 | 1 | 48.5 |
| 6 | 37.80 | 32.20 | .85 | 1 | 50.0 |
| 5 | 36.70 | 31.33 | .85 | 1 | 49.0 |
| 5 | 35.20 | 32.30 | .92 | 1 | 50.0 |
| 5 | 36.40 | 30.40 | .84 | 1 | 50.0 |
| 5 | 37.20 | 31.10 | .84 | 1 | 50.0 |
| 5 | 36.99 | 31.37 | .85 | 1 | 50.0 |
| 2 | 36.50 | 30.12 | .83 | 1 | 50.0 |
| 2 | 38.00 | 31.60 | .83 | 1 | 50.0 |
| 2 | 36.40 | 30.10 | .83 | 1 | 50.0 |

The bar chart of FIG. 4 compiles results showing the critical nature of the roller configurations, and identifying the roller set 5 as consistently giving higher yields than the conventional roller configuration in use (2). Also it is clear that this is done without any serious sacrifice of throughput volume, as seen from the comparison of conventional roller set 2 with the critical roller set 5. It is even observed that efficiencies close to 100% yield are obtainable (batches A to D) with roller set 5, even with batch D, also seen in Table 1, exceeding 100%. It is clear that this critical roller configuration of roller set 5 increases the yield over the other roller set dimensions. Also it is clear that a critical roller configuration of different dimensions might be found for a different range of conditions such as for very small size prawns or for warm water shrimp, etc. by proceeding with the same method to determine criticality of the roller set diameters.

Figure 5:
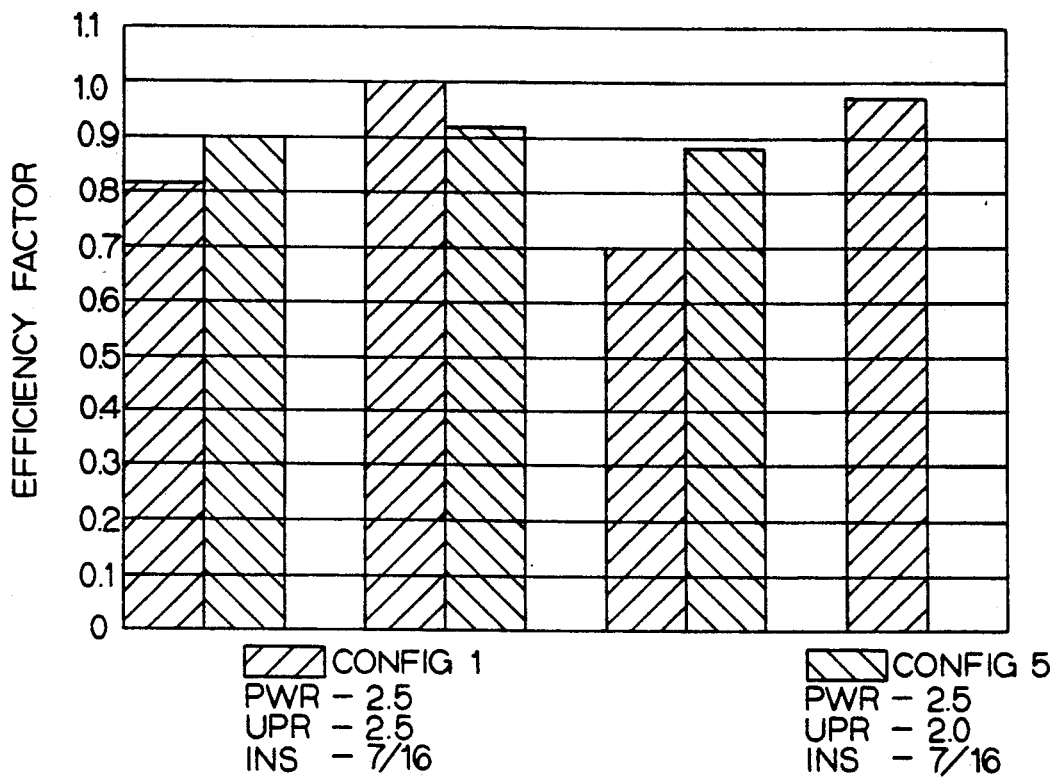
FIG. 5 is a bar chart summarizing the yield results of two roller sets for intermediate sized shrimp.
Figure 6:
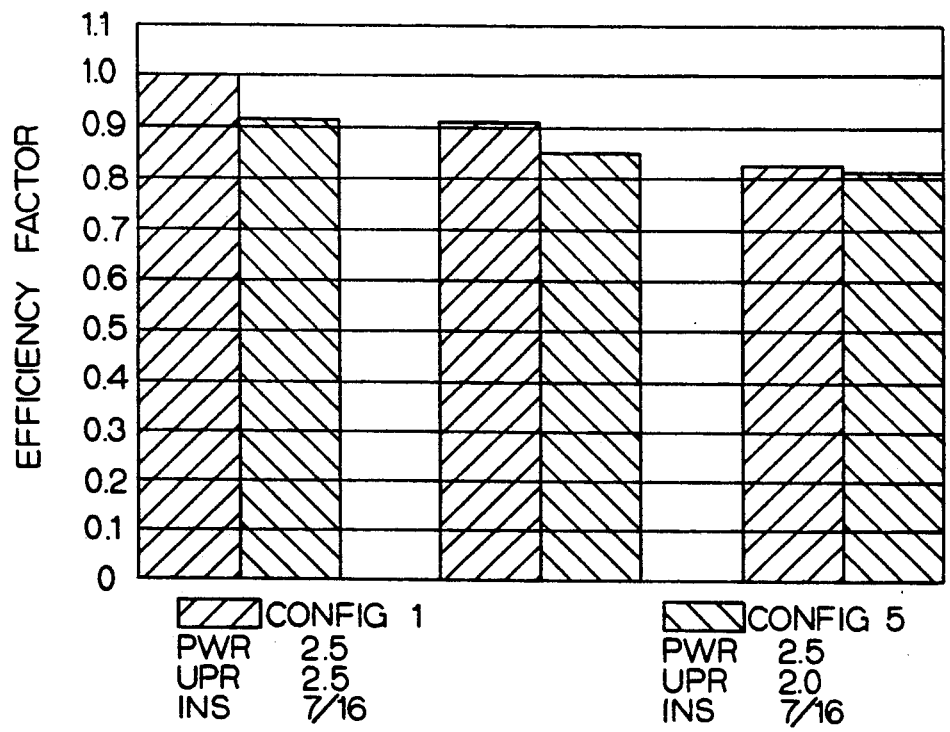
FIG. 6 is a bar chart summarizing the yield results for two roller sets for larger sized shrimp.

Observe from FIG. 4, the clear and substantial improvement in yield that roller set 5 dimensions give over the previously optimized roller set 2 dimensions for size 1 shrimp. The bar charts of FIGS. 5 and 6 show comparative results between roller configuration 1, the best yield performer for larger size 2 and 3 shrimp respectively and roller configuration 5, which very closely matches the yield of configuration 1. This confirms that for a wide range of raw shrimp sizes, the critical diameters of roller set 5 produces significantly improved yields and the best yields of any set over a wide range of size variations including those in the range of 90/kg to 350/kg. This critical roller set may be characterized by a roller diameter ratio of 40:32:7.

Now, with reference to FIG. 1, it may be seen that there are nine 3 inch (7.5 cm) diameter power rollers across the peeling tray to give sixteen peeling nips in the interactive region with the upper channel forming rollers. With the smaller critical diameter of 2.5 inch (6.4 cm) of roller configuration 5, eleven rollers fit into the peeling tray, thus increasing the number of peeling channels. Accordingly, unexpectedly the critical roller configuration also provides means for increasing the throughput quantity of shrimp being processed. Accordingly this invention produces an improved peeler apparatus that is capable not only of significantly improved yield of usable shrimp meat, but also capable of processing even greater throughput quantities of raw shrimp.

Having therefore improved the state of the art by providing roller type shrimp peeling apparatus producing higher yields of output shrimp meat and methods of determining optimum yields of usable output shrimp meat, which provide solutions that do not obsolete existing commercial installations, those features of novelty defining the spirit and nature of the invention are set forth with particularity in the following claims.

We claim:

1. The method of improving the yield of shrimp from cylindrical roller type shrimp peeling equipment comprising the steps of:

measuring the yield of peeled shrimp for each of a variety of batches of raw shrimp product peeled by said equipment with a predetermined set of roller diameters as representative of variable raw material operating conditions encountered at a peeling site establishing from the measuring, a predetermined expected yield standard while peeling shrimp from each of the batches with shrimp peeler apparatus having sets of at least two interacting rotatable peeling rollers under similar peeling conditions controlled to minimize the effect of variables of equipment and operating conditions of the equipment on the yield of peeled shrimp meat, selecting as a primary variable the relative diameter ratios of the peeling rollers for peeling shrimp in said peeler apparatus, peeling shrimp and determining the yields of peeled shrimp for each of the batches produced by a plurality of different diameter ratios of the rollers in the sets of rollers, and operating the equipment with a set of peeling rollers having critical diameter relationships as established by producing the highest comparative yield for a predetermined range of said operating conditions encountered in peeling the batches of shrimp with the different sets of rollers, thereby improving the yield standard of shrimp at said peeling site from said peeling equipment with said predetermined set of roller diameters.

2. The method of improving the yield of shrimp peeled with cylindrical roller type shrimp peeling equipment having sets of three interacting rollers, namely power rollers, intermediate channel forming rollers located between power rollers and insert rollers positioned in the nips between the power rollers and insert rollers, comprising the steps of:

providing for the peeling equipment a plurality of sets of interacting rollers of predetermined diameter ratios with power rollers of largest diameter, intermediate rollers of no greater diameter than the power rollers and insert rollers with a smallest roller diameter, peeling representative shrimp at a peeling site under similar conditions changing substantially only the roller sets and selecting as the critical diameter ratio of the rollers for use at the site to improve the output yield of useful shrimp meat from shrimp peeled by said equipment a ratio of diameters determined from the set of rollers producing the greatest yield of useful shrimp meat in said peeling step.

3. The method of claim 2 further comprising the step of replacing at least one of the roller diameters in said equipment for obtaining a roller set with rollers of said critical diameter ratio to improve the yield of output shrimp meat.

4. The method of claim 2 comprising the step of establishing the critical diameter ratio between the rollers as the ratio of diameters of power rollers to intermediate rollers to insert rollers of substantially 40:32:7.

5. The method of claim 2 further comprising the steps of replacing power rollers of a diameter substantially 3 inches (7.6 cm) with power rollers of a diameter of substantially 2.5 inches (6.4 cm), employing intermediate rollers of a diameter of substantially 2 inches (5 cm) and insert rollers of a diameter of substantially 7/16 inch (1.1 cm) and peeling shrimp with an improved yield.

6. The method of claim 5 further comprising the step of peeling shrimp of the Pandalus species in size ranges from 90/kg to 350/kg.

7. The method of claim 6 further comprising the step of peeling cooked shrimp in said apparatus when they are hot from cooking.

8. Improved roller type shrimp peeling apparatus, comprising in combination:

sets of interacting cylindrical shrimp peeling rollers with a plurality of power rollers spaced apart in a peeling tray and interacting with a plurality of intermediate rollers spaced between the power rollers and further having a plurality of insert rollers spaced between nips formed between the intermediate rollers and the power rollers to interact with both the intermediate and power rollers, means for feeding shrimp to the rotating rollers for peeling by means of the interaction between said sets of interacting rollers, and means for improving the output efficiency in peeling of usable shrimp meat over a substantial range of variety in input shrimp sizes and types to be peeled comprising power rollers and intermediate rollers of substantially less than three inches in diameter disposed in the peeling tray to form at least one more set of rollers than will fit in the peeling tray with three inch diameter rollers.

9. The apparatus of claim 8, wherein the roller diameters are critically related to the yield from Pandalus borealis species of input shrimp to be peeled in size ranges from substantially 90/kg to 350/kg.

10. The apparatus of claim 8 with power roller diameters of substantially 2.5 inch (6.4 cm), intermediate roller diameters of substantially 2 inch (5 cm) and insert rollers of substantially 7/16 inch (1.1 cm).

11. The apparatus of claim 10 with eleven power rollers located in said tray.

* * * * *